United States Patent [19]

Persik et al.

[11] 4,174,559
[45] Nov. 20, 1979

[54] FASTENING METHOD

[75] Inventors: James E. Persik; Gerald E. Persik, both of Menomonee Falls, Wis.

[73] Assignee: J.J. & M., Milwaukee, Wis.

[21] Appl. No.: 876,295

[22] Filed: Feb. 9, 1978

[51] Int. Cl.² ............ B21D 39/00; B23P 11/02
[52] U.S. Cl. .................. 29/509; 29/522 A; 13/116 FF; 113/121 C; 220/272; 220/273; 403/274
[58] Field of Search ............. 29/509, 522, 156.8 CF; 403/280, 274; 113/116 FF, 121 C; 220/270, 272, 273

[56] References Cited

U.S. PATENT DOCUMENTS

| 820,586 | 5/1906 | Marshall | 113/116 FF UX |
| 3,031,748 | 5/1962 | Focht | 13/116 FF X |
| 3,557,441 | 1/1971 | Boik et al. | 113/116 FF X |
| 3,731,369 | 5/1973 | Johnson | 113/116 FF X |
| 3,887,984 | 6/1975 | Erlichman | 113/116 FF X |

Primary Examiner—Charlie T. Moon

[57] ABSTRACT

Two sheets of deformable material are securely fastened together without the use of adhesives, separate rivets or fasteners by forming a closed end cylindrical projection on the upper surface of the first sheet, placing the second sheet having an aperture over the first sheet, the aperture receiving the projection, and deforming the projection in the aperture to produce a tight friction fit and form a lip which overlaps the exterior rim of the aperture to limit its enlargement. In a preferred embodiment two plates are fastened together to form a rotor by striking the projection with a die having an annular groove forcing one part of the projection into the aperture and forming another part of the projection into the lip.

2 Claims, 5 Drawing Figures

FASTENING METHOD

BACKGROUND OF THE INVENTION

The invention relates to a fastening method for securely fastening two sheets of deformable material together. The method includes the formation of a rivet-like projection which is an integral part of the first sheet of material and which extends through an aperture in a second sheet of material.

Integral rivets have been used to fasten pull tabs to aluminum containers in the packaging industry. The materials used for these containers, including thin sheets of aluminum alloys, are more easily deformable than many other types of sheet material, including most other types of sheet metal. In making containers the object is to provide a fastener for a pull tab which is stronger than a container wall having a scoreline which defines a tear away portion so that as the tab is pulled a portion of the container wall will be removed. In other fields of manufacturing a much stronger fastener is needed for materials such as steel alloys which are not so easily deformable. These fasteners must withstand stress greater than that applied in the opening of an aluminum container.

In U.S. Pat. Nos. 3,404,648 and 3,198,155 two sheets of aluminum are deformed simultaneously to form a double layer integral rivet in a container wall. This method is not applicable to heavier or thicker materials which are less deformable than an aluminum container wall because it is not practical to deform a double thickness of such materials. In U.S. Pat. Nos. 3,688,385 and 3,637,106, a projection formed in a container wall is drawn through an aperture formed in a pull tab and is then bent down over the edges formed around the aperture. This method is not practical for heavier or thicker materials because a sufficient amount of material cannot be drawn to extend through the aperture to form a head which secures the two sheets of materials together. It is the practice in industries using heavier or thicker materials to make a projection in one sheet which is inserted through an aperture in a second undeformed sheet, and to then deform the projection in the aperture to produce a tight fit and to fasten the two sheets together. A problem with this method has been that the force required to deform the projection also deforms or enlarges the aperture which prevents a tight fit with the projection.

SUMMARY OF THE INVENTION

The general object of the invention is to provide a method of securely fastening two sheets of deformable material together without the use of adhesives, separate rivets or fasteners.

More specifically, the invention contemplates a method of securely fastening two sheets of deformable material together by forming a closed end cylindrical projection on the first sheet, placing the second sheet over the first sheet, the second sheet having an aperture through which the projection extends, the closed end of the projection protruding from an outer surface of the second sheet, and deforming the closed end of the projection, to force one portion into the aperture to provide a tight friction fit and to form another portion into a lip which overlaps the exterior rim of the aperture to limit its enlargement.

Another general object of the invention is to fasten two sheets of material together to withstand high stress with simple steps that can be performed with a punch press of the type commonly employed in metalworking shops.

A more specific object of the invention is to provide a method of using a specially configured die to form the fasteners.

Another specific object of the invention is to fasten two sheets together in which the material is difficult to deform relative to materials which can be formed in double thicknesses and which can be drawn from one sheet through an aperture in a second sheet and formed in a head which holds the sheets together. The invention can be practiced to advantage, however, with any material in which it is desired to form a tight friction fit of a projection in an aperture, while limiting its enlargement.

Other objects and advantages will be apparent from the drawings, and the description and claims that follow.

DESCRIPTION OF THE PREFERRED EMBODIMENT

Figure 1:
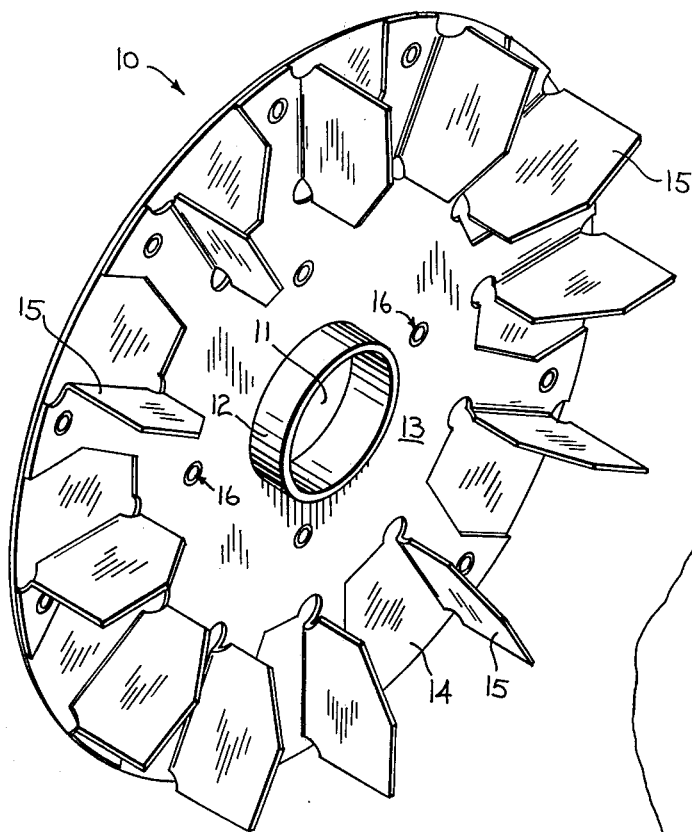
FIG. 1 is a perspective view of a rotor having two plates fastened together with the method of the present invention.
Figure 2:
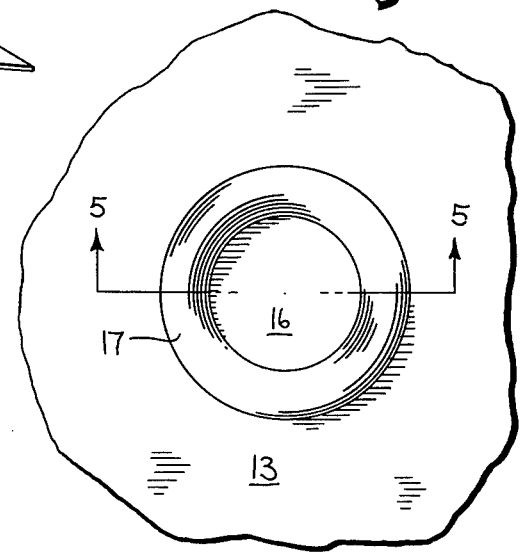
FIG. 2 is an enlarged elevation view of an integral fastener formed between the two plates in the rotor of FIG. 1.

The method of the present invention now will be more fully described in connection with the assembly of the fan rotor 10 shown in FIG. 1. The rotor 10 has a central opening 11 for receiving a shaft which is not shown, and a circular flange 12 which forms a collar for mounting the rotor assembly 10 on the shaft. The rotor 10 includes a face plate 13 and a back plate 14 each formed from a metal sheet. Portions of the face plate 13 have been cut and bent to form rotor blades 15. The two plates 13 and 14 are fastened together by a plurality of integral fasteners 16 which include a ring-shaped reinforced lip 17 which is seen best in FIG. 2.

Figure 3:
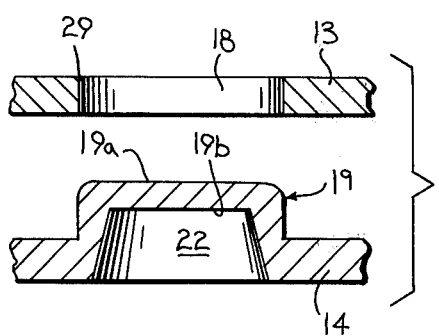
FIG. 3 is an enlarged view showing two sheets positioned with the projection on one plate aligned with the aperture in the other plate prior to the exercise of the inventive method.
Figure 4:
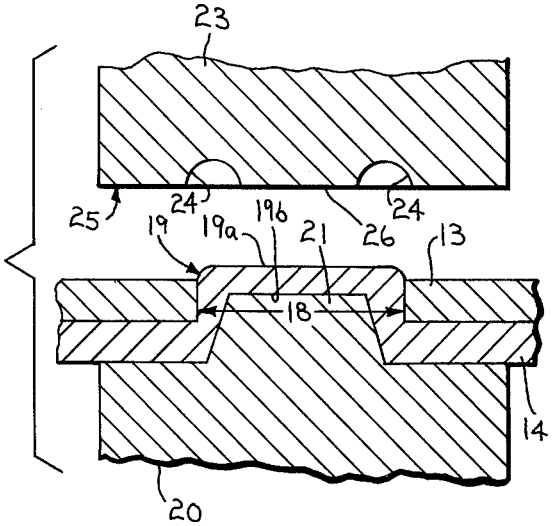
FIG. 4 is an enlarged sectional view showing two plates assembled with the projection in the aperture and showing the tooling that is preferably used to form the fastener.
Figure 5:
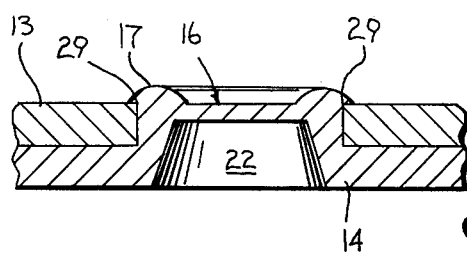
FIG. 5 is an enlarged sectional view of the fastener taken along lines 5—5 in FIG. 2.

The steps involved in performing the preferred method of the invention are illustrated in FIGS. 3-5. The face plate 13 which has a plurality of apertures 18 and the back plate 14 which has a plurality of closed end cylindrical projections 19 are positioned so that the apertures 18 and the projections 19 are aligned. As seen in FIG. 3 the projection 19 is tall enough to extend through the aperture 18 so that the top 19a of the projection protrudes above the outer surface of the face plate 13. The plates 13 and 14 are then brought together so that the projections 19 are positioned within and extend through the the manner shown in FIG. 4.

As seen in FIG. 4, in which only one projection 19 and one aperture 18 are shown, the assembled plates 13 and 14 are positioned on a support member 20 having a head 21 which extends into a hollow portion 22 of the projection 19 from the back side of the back plate 14. The head 21 of the support member 20 extends into the hollow portion 22 of the projection 19 and contacts the bottom wall 19b of the closed end projection 19.

Still referring to FIG. 4, it is seen that a die 23 is positioned to strike the top of the projection 19. The die 23 has a ring-shaped groove 24 on its front face 25 and a central region 26 enclosed by the groove 24. The inner diameter of the ring defining the groove 24 is less than the diameter of the aperture 18 and the outer diameter of the ring is greater than the diameter of the aperture 18. When the plates 13, 14 are positioned on the support 20 is shown and the die 23 is struck against the closed end of the projection 19, the integral fastener 16 shown in section in FIG. 5 is formed.

As the result of the striking action, not only is a tight friction fit formed between the projection 19 and the aperture 18, but also a portion of the material of the closed end of the projection 19 extending above the outer surface of the plate 13 is formed to form the ring-shaped lip 17. As seen only in FIG. 5, the lip 17 overlaps the exterior rim 29 of the aperture 18 and grips a portion of the face plate 13 surrounding the aperture 18. The lip 17 thus effectively limits the enlargement or distortion of the enlargement or distortion of aperture 18.

Preferably the projections 19 are formed in the back plate 14 before the plates 13 and 14 are brought together, and the projections 19 are formed by a coining process using a punch or other suitable tool directed into the back side of the back plate 14. However, the invention is not limited as method of forming the projections 19 are well known to those skilled in the art.

The method of the present invention not only provides a useful means of securing two sheets of material together, but also provides a means of doing so in a conventional punch press without resorting to the use of additional metal shaping machinery. Other advantages of the method of the invention will be readily apparent to those skilled in the art.

The rotor 10 is made of plates of cold rolled steel having a thickness of 0.030 inches. However, it will be apparent to those skilled in the art that other materials, including other sheet metals can be fastened together by the described method. Representative of suitable materials are aluminum, aluminum alloys, and the complete range of steel alloys including stainless steel. Preferably the approximate thickness of these sheet materials would be in the range of 24 gauge (0.025 inches) to 10 gauge (0.140 inches), but sheet materials up to approximately one inch in thickness could conceivably be fastened together by the method described. In general, sheet material of any thickness which can be advantageously secured by the described method is contemplated as being within the scope of the invention.

In the specific embodiment just described, it also should be apparent to those skilled in the art that certain variations may be made in the method without departing from the fundamentals of the invention. The lip 17, for example, need not be ring-shaped as long as it overlaps the rim 29 of the aperture 18, and performs its necessary function. Furthermore, the aperture 18 need not be circular as shown in the drawings, nor must the projection 19 necessarily be a cylindrical projection, but these features are preferred. It should also be apparent that a plurality of more than two sheets might be fastened together using the method. In view of the many possible embodiments reference should be made to the following claims to determine the scope of the invention.

We claim:

1. The method of securely fastening together two sheets of metal each having a thickness of at least about 0.025 inches which comprises:
    (a) forming a hollow back, closed end cylindrical projection on one piece of metal;
    (b) forming a projection-receiving aperture in the second piece of metal;
    (c) positioning the first piece of metal on a support member having a head which extends into and fills the hollow back of the projection;
    (d) positioning the second piece of metal upon the first with the projection received in and extending above the projection-receiving aperture; and
    (e) then striking the head of the projection with a die having a ring-shaped groove having an outer diameter greater than that of the aperture and a circular flat central portion having a diameter less than the diameter of the aperture so that a portion of the metal of the head of the projection extending above the aperture forms a ring-shaped lip that overlaps the edge of the aperture, grips the surface of the second piece of metal and effectively limits the enlargement of the aperture and a tight friction fit is formed between the projection and the aperture.

2. The method of claim 1 in which the metal sheets have a thickness between about 0.025 inches and about 0.140 inches.